United States Patent
Murra et al.

(10) Patent No.: US 12,341,983 B2
(45) Date of Patent: Jun. 24, 2025

(54) INTEGRATING AN ENCODER FOR HIERARCHICAL VIDEO CODING

(71) Applicant: V-NOVA INTERNATIONAL LIMITED, London (GB)

(72) Inventors: Fabio Murra, London (GB); Robert Johnson, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 336 days.

(21) Appl. No.: 18/007,211

(22) PCT Filed: Jul. 28, 2021

(86) PCT No.: PCT/GB2021/051951
§ 371 (c)(1),
(2) Date: Jan. 27, 2023

(87) PCT Pub. No.: WO2022/023747
PCT Pub. Date: Feb. 3, 2022

(65) Prior Publication Data
US 2023/0262240 A1     Aug. 17, 2023

(30) Foreign Application Priority Data

Jul. 28, 2020  (GB) .................................. 2011670
Nov. 27, 2020  (GB) .................................. 2018734

(51) Int. Cl.
*H04N 19/33* (2014.01)
*G06F 9/445* (2018.01)
(Continued)

(52) U.S. Cl.
CPC ......... *H04N 19/33* (2014.11); *G06F 9/44526* (2013.01); *H04N 19/30* (2014.11); *H04N 19/42* (2014.11)

(58) Field of Classification Search
CPC ...................................................... H04N 19/33
(Continued)

(56) References Cited

U.S. PATENT DOCUMENTS 9,060,175 B2 *  6/2015  Wang ................... H04N 19/176
2021/0297729 A1 *  9/2021  Fersch ............... H04N 21/4398

FOREIGN PATENT DOCUMENTS

WO        2020/212701        10/2020

OTHER PUBLICATIONS

Ozer Jan: "How to Encode With Lcevc", Streaming Media Magazine, Mar. 12, 2020 (Mar. 12, 2020), XP055853828.
(Continued)

*Primary Examiner* — Yulin Sun
(74) *Attorney, Agent, or Firm* — Workman Nydegger

(57) ABSTRACT

A video encoder is provided that has: one or more encoder plug-ins that provide a wrapper for one or more respective base codecs to implement a base encoding layer, each wrapper implementing an interface for data exchange with a corresponding base codec, the base encoding layer being configured to encode and decode a video signal; an enhancement encoder to implement an enhancement encoding layer, the enhancement encoder being configured to: receive a decoded video signal from one of the one or more encoder plug-ins, the decoded video signal comprising a decoded version of an encoded video signal generated by said one of the one or more encoder plug-ins, and generate an encoded enhancement signal for the encoded video signal, the encoded enhancement signal comprising one or more layers of residual data, the residual data being generated based on a comparison of data derived from the decoded video signal and data derived from an input video signal, and, an encoder integration layer to control operation of the one or more encoder plug-ins and the enhancement encoder to generate (Continued)

an encoding of the input video signal using the base encoding layer and the enhancement encoding layer, wherein the encoder integration layer provides a control interface for the video encoder. A system, methods and computer readable medium are also provided.

17 Claims, 3 Drawing Sheets

(51) Int. Cl.
    *H04N 19/30*     (2014.01)
    *H04N 19/42*     (2014.01)

(58) Field of Classification Search
    USPC .................................................. 375/240.01
    See application file for complete search history.

(56) References Cited

OTHER PUBLICATIONS

Test Model 4.1 of Low Complexity Enhancement Video Coding, Conference Proceedings Article, Jun. 6, 2020 130. MPEG meeting; Apr. 20, 2020-Apr. 24, 2020; Alpbach; (Motion Picture Expert Group or ISO/IEC JTC1/SC29/WG 11), Jun. 6, 2020 http://phenix.int-evry.fr/mpeg/doc_end_user/documents/130_Alpbach/wg11/w19237.zip w19237—Description of Test Model (LTM 4.1) of LCEVC—v7.docx.

The OpenMAX Integration Layer standard CELF Embedded Linux Conference 2007, Apr. 19, 2007, elinux.org https://elinux.org/images/e/e0/The_OpenMAX_Integration_Layer_standard.pdf.

International Search Report & Written Opinion for application No. PCT/GB2021/051951 mailed on Mar. 11, 2021.

* cited by examiner

INTEGRATING AN ENCODER FOR HIERARCHICAL VIDEO CODING

CROSS-REFERENCE TO RELATED APPLICATIONS

The present invention is a 35 U.S.C. § 371 U.S. National Stage of PCT Application No. PCT/GB2021/051951, filed on Jul. 28, 2021, which claims priority to United Kingdom Patent Application No. 2011670.3, filed on Jul. 28, 2020, and United Kingdom Patent Application No. 2018734.0, filed Nov. 27, 2020. The entire content of each of the aforementioned patent applications is incorporated herein by reference.

TECHNICAL FIELD

The present invention relates to methods for encoding signals, such as video signals, using hierarchical coding formats, as well as encoders and encoding systems. The present invention specifically relates to a video encoder for integrating a hierarchical encoder, preferably an LCEVC encoder, into an application or software stack.

BACKGROUND

A hybrid backward-compatible coding technology has been previously proposed, for example in WO 2014/170819 and WO 2018/046940, the contents of which are incorporated herein by reference. Further examples of tier-based coding formats include ISO/IEC MPEG-5 Part 2 LCEVC (hereafter "LCEVC"). LCEVC has been described in WO/2020/188273A1, and the associated standard specification documents including the Draft Text of ISO/IEC DIS 23094-2 Low Complexity Enhancement Video Coding published at MPEG 129 meeting in Brussels, held Monday, 13 Jan. 2020 to Friday, 17 Jan. 2020, both documents being incorporated by reference herein in their entirety.

In these coding formats a signal is decomposed in multiple "echelons" (also known as "hierarchical tiers") of data, each corresponding to a "Level of Quality", from the highest echelon at the sampling rate of the original signal to a lowest echelon. The lowest echelon is typically a low quality rendition of the original signal and other echelons contain information on correction to apply to a reconstructed rendition in order to produce the final output.

LCEVC adopts this multi-layer approach where any base codec (for example, Advanced Video Coding—AVC, also known as H.264, or High Efficiency Video Coding—HEVC, also known as H.265) can be enhanced via an additional low bitrate stream. LCEVC is defined by two component streams, a base stream typically decodable by a hardware decoder and an enhancement stream consisting of one or more enhancement layers suitable for software processing implementation with sustainable power consumption. The enhancement provides improved compression efficiency to existing codecs, and reduces encoding and decoding complexity.

Since LCEVC and similar coding formats leverage existing decoders and are inherently backwards-compatible, there exists a need for efficient and effective integration with existing video encoding implementations without complete re-design. Examples of known encoding implementations include the software tool FFmpeg.

Moreover, LCEVC is not limited to known codecs and is theoretically capable of leveraging yet-to-be-developed codecs. As such any LCEVC implementation should be capable of integration with any hitherto known or yet-to-be-developed codec, implemented in hardware or software, without introducing coding complexity.

It should be noted that in some realisations of these coding formats both an encoding and decoding operation may be performed by a base codec during video encoding. That is, the enhancement stream may be created by comparing a version of the input signal and a decoded version of the encoded base stream. Thus, in these realisations, there exists a need to efficiently and effectively instruct both an encoding and decoding operation using the base codec, at the encoder.

SUMMARY

Aspects and variations of the present invention are set out in the appended claims. Certain unclaimed aspects are further set out in the detailed description below.

According to one aspect, there is provided a video encoder comprising: one or more encoder plug-ins that provide a wrapper for one or more respective base codecs to implement a base encoding layer, each wrapper implementing an interface for data exchange with a corresponding base codec, the base encoding layer being configured to encode and decode a video signal; an enhancement encoder to implement an enhancement encoding layer, the enhancement encoder being configured to: receive a decoded video signal from one of the one or more encoder plug-ins, the decoded video signal comprising a decoded version of an encoded video signal generated by said one of the one or more encoder plug-ins, and generate an encoded enhancement signal for the encoded video signal, the encoded enhancement signal comprising one or more layers of residual data, the residual data being generated based on a comparison of data derived from the decoded video signal and data derived from an input video signal, and, an encoder integration layer to control operation of the one or more encoder plug-ins and the enhancement encoder to generate an encoding of the input video signal using the base encoding layer and the enhancement encoding layer, wherein the encoder integration layer provides a control interface for the video encoder.

Preferably the enhancement encoder is an LCEVC encoder such that the encoder integration layer, one or more plug-ins and the enhancement encoder together provide an LCEVC encoding software stack. The LECVC encoding software stack may be implemented in one or more LCEVC encoder libraries and thus provides an optimised software library for encoding MPEG-5 enhanced streams.

The video encoder according to this aspect is easy to deploy, that is, it may be supported by a broad range of encoding and player vendors or be implemented to easily update systems. Aspects of the invention provide the ability to deploy LCEVC at any level of a software stack with a range of options, from low-level APIs to implementations in commonly used open-source encoders and players.

The encoder integration layer may be configured to: receive ownership of a frame of the input video signal; instruct encoding of the frame by the one or more encoding plug-ins and the enhancement encoder; and, provide a pointer to a location of output data upon request via the control interface. In this way the encoder integration layer allows an application layer to easily and simply retrieve encoded data without interfering with the encoding process. In preferred implementations, together with the pointer, the encoder integration layer may provide a success indication via the control interface allowing a user or application layer to identify that the data has been processed successfully and can be retrieved without complication. Additionally, the pointer may be provided within a data structure further comprising ancillary information associated with the encoding of the input video signal. In certain implementations the data structure may be read-only. Beneficially, the data structure allows for the application to not have to create such manually. The ancillary information may include all information for an encoded frame of video such as frame type, data length, quantisation parameter used, timestamp information, configuration flags or user data information.

The encoder integration layer may optionally be further configured to create a data structure for a type of frame to be encoded from the frame of the input video signal, the data structure comprising a set of planes which collectively make up the frame, and to populate the planes with frame data from the frame of the input video signal. Planes of each frame may be, for example, YUV and are typically associated with the type of frame to be encoded. Thus, the encoder integration layer provides for an internal input mode in which an application layer need only provide frames to the layer for the encoding to be performed.

Additionally or alternatively, the encoder integration layer may be further configured to identify that a frame is externally allocated and retrieve a data structure comprising a set of planes which collectively make up a frame of the input video signal and a set of parameters necessary to encode the frame. Thus the application layer may also provide for the input to be externally allocated so that the user may specify the population of the frames. The data structure may be absent of parameters necessary to encode the frame and the encoder integration may populate such fields. The encoder integration layer may identify that a frame is externally allocated during initialisation. Examples of parameters necessary to encode the frame include number of planes, frame type and timestamp information.

In certain embodiments the encoder integration layer may be configured to obtain a set of encoding properties and, upon initialisation of the encoder integration layer, via the control interface, confirm successful initialisation according to the encoding properties. The encoding properties may for example include resolution, frame rate and bit rate and may be comprised in an object sent to the control interface as part of initialisation of the encoder implementation layer so that the encoder integration layer is ready to receive frames.

The encoder integration layer may be configured to receive a further set of encoding properties and instruct a reconfiguration of the base encoder layer using the one or more encoder plug-ins. The reconfiguration may occur during processing of a video. In this way, encoding properties such as target bit rate or frame rate may be dynamically reconfigured where a base encoder also supports dynamic reconfiguration.

In certain embodiments the control interface may provide for a configuration system using a combination of read-only and writable properties. The interface allows for efficient communication of properties accessible via an Application Programming Interface (API) call to the encoder integration layer.

In a first example of the configuration interface, the encoder integration layer is configured to: obtain a set of configuration defaults; retrieve a configuration data structure comprising one or more configuration properties; and override a configuration default of the set of configuration defaults corresponding to the one or configuration properties. That is, a configuration default may be overridden using the respective configuration property. The configuration data structure may be a string or a JavaScript Object Notation (JSON) string communicated via the control interface.

In a second example of the configuration interface, the control interface comprises a set of predefined queries, wherein the encoder integration layer is configured to receive a query from the set of predefined queries and return a corresponding encoding or configuration property of the encoder integration layer. In this way encoding configuration properties for the base encoder and LCEVC enhancement may be made publically available and can be queried through an API, that is, the control interface. A query may return an array of all property groups which each contain an array of all properties in that group. Alternatively, if the name of the parameter is known then it can be directly queried.

In a third example of the configuration interface, the control interface comprises a set of predefined metadata queries, the encoder integration layer is configured to receive a query for one or more metadata properties, wherein the encoder integration layer is configured to retrieve metadata from the one or more encoder plug-ins and return a read-only metadata property corresponding to the one or more metadata properties. Metadata may thus be prevented from being set externally but may be accessed by the user or application layer via the control interface. The metadata may relate to the one or base codes or enhancement encoders, for example the metadata properties may include global headers and shape or the type of base codec.

More preferably the control interface may comprise a set of predefined metadata queries, and wherein the encoder integration layer may be configured to receive a query for one or more metadata properties, and the encoder integration layer may be configured to retrieve metadata from the one or more encoder plug-ins and return a location of a block of memory storing the metadata in response to the query. The block may be contiguous. In this way the video encoder may be incorporated with a base encoder plugin to present metadata to the user while being ignorant to its usage. This approach may be used to allow the encoder integration layer to report to the user some internal values, or data that are either not interpreted as properties, or that cannot be expressed as properties. For example, H.264 global headers may be accessed from memory by a user or application layer.

Furthermore, the control interface may provide a set of predetermined optimisation instructions and wherein the encoder integration layer may be configured to receive one or more of the predetermined instructions and optimise the operation of the one or more encoder plug-ins and the enhancement encoder in accordance with a predefined variant corresponding to the received instructions. The control interface may thus provide to the user a mechanism to 'tune' the encoding use sets of predetermined parameters, for example, according to the aims of the encoding. In certain further examples, the encoding may be optimised for peak signal-to-noise ratio (PSNR) using a set of predetermined parameters to achieve that goal, while the control interface does not have to specify specific adjustment of those parameters.

According to a further aspect there may be provided a method of encoding a video signal. The method may utilise a video encoder according to any of the above aspects. Preferably the method provides steps for encoding streams using an encoder integration layer as set out above. The method may comprise: initialising the encoder integration layer; while there are frames to encode of an input video signal: retrieving an input frame of the input video signal and passing ownership of the frame to the video encoder via the control interface; waiting for the video encoder to encode the input frame and subsequently fetching output data; and, releasing ownership of the output data back to the encoder integration layer, and shutting down the encoder integration layer.

In certain embodiments an integration method of an encoder integration layer according to any of the above aspects may comprise the steps of: creating an encoder integration layer; initialising the encoder integration layer; passing an input video signal to the encoder integration layer; fetching an encoded bitstream from the encoder integration layer; flushing the encoder integration later; and, destroying the encoder integration layer.

According to further aspects of the present invention, the video encoder and methods may be provided by a computer readable medium comprising instructions which, when executed by a processor, causes the processor to perform the functionality of the video encoder or carry out the steps of the methods.

According to a further aspect there may be provided a video encoding system, comprising: a video encoder according to any of the above aspects; one or more base codecs; and, an application layer which provides one or more calls to the video encoder via the control interface to instruct video encoding. The application layer may be also be considered a functional layer and may be provided at any level of a software stack. The one or more base codecs may be associated with the encoder plug-ins providing a wrapper for the base codec(s) as set out in any of the above aspects. Examples of the one or more base codecs include, for example, AVC, HEVC, VP9, EVC, AV1 and may be implemented in software or hardware as is commonplace in this field.

In certain implementations, the application layer, or functional layer, may be configured to, via the control interface of the first aspect of the invention: initialise the encoder integration layer; while there are frames to encode of an input video signal: retrieve an input frame of the input video signal and pass ownership of the frame to the video encoder via the control interface; wait for the video encoder to encode the input frame and subsequently fetch output data; and, release ownership of the output data back to the encoder integration layer, and shut down the encoder integration layer. In this way, the encoder integration layer, together with a suitably configured functional layer, together communication with a simple, yet powerful API.

According to a further aspect of the invention there may be provided an encoder integration layer to control operation of one or more encoder plug-ins and an enhancement encoder to generate an encoding of an input video signal using a base encoding layer and an enhancement encoding layer, wherein the encoder integration layer provides a control interface for a video encoder, wherein the one or more encoder plug-ins provide a wrapper for one or more respective base codecs to implement the base encoding layer, each wrapper implementing an interface for data exchange with a corresponding base codec, the base encoding layer being configured to encode and decode a video signal; and, the enhancement encoder implements an enhancement encoding layer, the enhancement encoder being configured to: receive a decoded video signal from one of the one or more encoder plug-ins, the decoded video signal comprising a decoded version of an encoded video signal generated by said one of the one or more encoder plug-ins, and generate an encoded enhancement signal for the encoded video signal, the encoded enhancement signal comprising one or more layers of residual data, the residual data being generated based on a comparison of data derived from the decoded video signal and data derived from the input video signal.

The encoder integration layer may also provide a control interface to the one or more plug-ins, such that additional wrappers for base codecs may be integrated with the encoder integration layer.

According to a further illustrative aspect, there is provided an encoder for encoding input data, wherein input data is encoded into a plurality of layers of data in a hierarchical structure, wherein the plurality of layers includes base layer data and at least one enhancement layer data, wherein the at least one enhancement layer data is useable to enhance a rendition of the base layer data at a first level of quality to an enhanced rendition at a second level of quality, the second level of quality being high then the first level of quality, characterized in that the encoder includes a base function arrangement for generating the base layer data (e.g. a base codec or encoder/decoder), and an enhancement layer arrangement for generating the at least one enhancement layer data (e.g. an enhancement encoder), wherein the encoder further includes a plug-in system (e.g. one or more encoder plug-ins) implemented using software to interface between the base function arrangement and the enhancement layer arrangement, and an applications layer arrangement for executing one or more software applications executable on computing hardware for controlling operation of the encoder; wherein the encoder further includes an orchestration unit (e.g. an encoder integration layer) for adapting or selecting one or more plugins of the plugin system to use when data is communicated between the enhancement layer arrangement and the base function arrangement; and wherein the orchestration unit, when in operation, reconfigures the decoder via the plugin system to accommodate to at least changes in operating characteristics of the base function arrangement and the enhancement layer arrangement.

Optionally, in the encoder, the orchestration unit (e.g. the encoder integration layer), when in operation, monitors changes in the operating characteristics of the base function arrangement and the enhancement layer arrangement, and reconfigures the plugin system (e.g. the one or more encoder plug-ins) as a function of the changes in the operating characteristics.

Optionally, in the encoder, the orchestration unit (e.g. the encoder integration layer) is arranged in operation to apply test data to the base function arrangement and the enhancement layer arrangement to determine their operating characteristics, and to implement a selection or an adaptation the plugin system (e.g. the one or more encoder plug-ins) as a function of the operating characteristics. More optionally, in the encoder, the selection or the adaptation is implemented using at least one of: machine learning, artificial intelligence (AI) algorithms. Optionally, for the artificial intelligence (AI) algorithms, there is employed one or more recursive neural networks (RNN); a recursive neural network (RNN) is a kind of deep neural network created by applying a same given set of weights recursively over a structured input, to produce a structured prediction over variable-size input structures, or a scalar prediction thereon, by traversing a given structure in topological order. RNN's have been successful, for example, in learning sequence and tree structures in natural language processing. It will be appreciated, in general, that API's have a pre-determined structure; if compilers are able to understand them, then the RNN's are also able to learn to adapt to them.

Optionally, in the encoder, the applications layer arrangement is updatable with enhancement functions that provide for additional functionalities to be provided by the decoder.

Optionally, in the encoder, the base function arrangement implements a base layer decoder complying to industry-recognized encoding standards (for example, AVC, H264, H265, MPEG2, MPEG4, MPEG5, LCEVC, VC-6 and so forth).

According to a further illustrative aspect, there is provided a method for (namely, a method of) controlling operation of an encoder for encoding input data, wherein input data is encoded into a plurality of layers of data in a hierarchical structure, wherein the plurality of layers includes base layer data and at least one enhancement layer data, wherein the at least one enhancement layer data is useable to enhance a rendition of the base layer data at a first level of quality to an enhanced rendition at a second level of quality, the second level of quality being high then the first level of quality, characterized in that the method further includes: (a) arranging for the encoder to include a base function arrangement for generating the base layer data (e.g. a base coder or encoder/decoder), and an enhancement layer arrangement for generating the at least one enhancement layer data (e.g. an enhancement encoder), (b) arranging for the encoder to include a plug-in system (e.g. one or more encoder plug-ins) implemented using software to interface between the base function arrangement and the enhancement layer arrangement, and an applications layer arrangement for executing one or more software applications executable on computing hardware for controlling operation of the encoder; (c) arranging for the encoder to include an orchestration unit (e.g. an encoder integration layer) for adapting or selecting one or more plugins of the plugin system to use when data is communicated between the enhancement layer arrangement and the base function arrangement; and (d) arranging for the orchestration unit, when in operation, to reconfigure the decoder via the plugin system to accommodate to at least changes in operating characteristics of the base function arrangement and the enhancement layer arrangement.

BRIEF DESCRIPTION OF FIGURES

Examples of systems and methods in accordance with the invention will now be described with reference to the accompanying drawings, in which.

DETAILED DESCRIPTION

This disclosure describes an implementation for integration of a hybrid backward-compatible coding technology with existing encoders and decoders, optionally via a software update. In a non-limiting example, the disclosure relates to an implementation and integration of MPEG-5 Part 2 Low Complexity Enhancement Video Coding (LCEVC). LCEVC is a hybrid backward-compatible coding technology which is a flexible, adaptable, highly efficient and computationally inexpensive coding format which combines a different video coding format, a base codec (i.e. encoder-decoder), (e.g. AVC/H.264, HEVC/H.265, or any other present or future codec, as well as non-standard algorithms such as VP9, AV1 and others) with one or more enhancement levels of coded data.

Example hybrid backward-compatible coding technologies use a down-sampled source signal encoded using a base codec to form a base stream. An enhancement stream is formed using an encoded set of residuals which correct or enhance the base stream for example by increasing resolution or by increasing frame rate. There may be multiple levels of enhancement data in a hierarchical structure. In certain arrangements, the base stream may be decoded by a hardware decoder while the enhancement stream may be suitable for being processed using a software implementation. Thus, streams are considered to be a base stream and one or more enhancement streams, where there are typically two enhancement streams. It is worth noting that typically the base stream may be decodable by a hardware decoder while the enhancement stream(s) may be suitable for software processing implementation with suitable power consumption.

The video frame is encoded hierarchically as opposed to using block-based approaches as done in the MPEG family of algorithms. Hierarchically encoding a frame includes generating residuals for the full frame, and then a reduced or decimated frame and so on.

Figure 1:
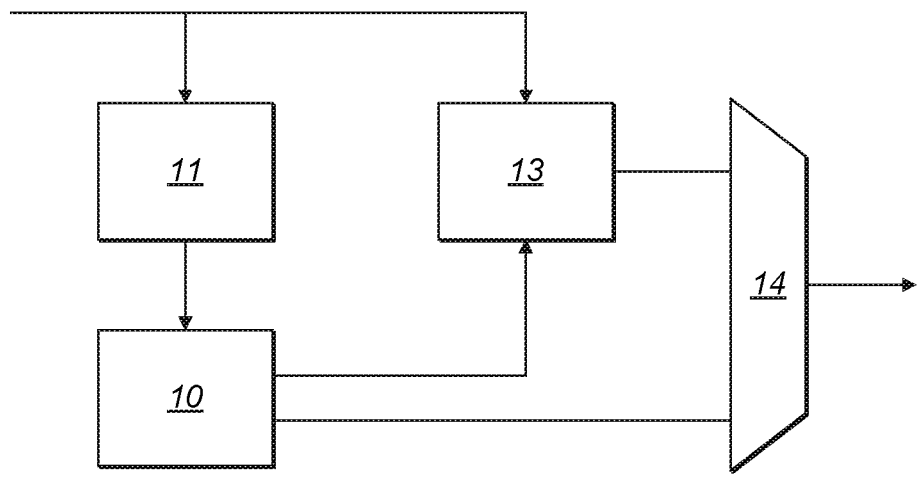
FIG. 1 shows a known, high-level schematic of an multi-layer encoding process.

For context purposes only, as the detailed structure of LCEVC is known and set out in the approved draft standards specification, FIG. 1 illustrates how LCEVC operates on the encoding side, assuming H.264 as the base codec. Those skilled in the art will understand how the examples described herein are also applicable to other multi-layer coding schemes (e.g., those that use a base layer and an enhancement layer) based on the general description of LCEVC that is presented with reference to FIG. 1. Turning to FIG. 1, the H.264 encoding 10 is performed on a down-scaled input at a lower resolution, typically a quarter of the desired output resolution. The output of the H.264 encoding 10, referred to herein as a base stream, may be supplemented with additional LCEVC data. The LCEVC data may be added, either in Supplemental Enhancement Information (SEI) of the H.264 Network Abstraction Layer (NAL), or in an additional data stream as identified using a Packet Identifier (PID). In FIG. 1, the uncompressed full resolution video is fed to a downscaler 11 before being passed to the H.264 encoding 10. The LCEVC encoder 13 generates the enhancement stream from two inputs: the H.264 (i.e. base layer) encoding, and the original uncompressed full resolution video, effectively filling the quality gap between the two. The enhancement stream (e.g. as encapsulated in the SEI messages) and the base stream (e.g. as constructed using VCL NAL as per a non-enhanced stream) are then combined into an output encoded bitstream.

To fully leverage the benefits of LCEVC, it is beneficial to combine an LCEVC encoder with a base codec for supported base codecs. There is thus proposed herein an encoder implementation and software stack to do this. The encoder implementation and software stack may be provided as an optimised software library for encoding and decoding MPEG-5 LCEVC enhanced streams, providing a simple yet powerful API. This allows developers flexibility and the ability to deploy LCEVC at any level of a software stack with a range of options from low-level APIs to implementations in commonly used open-source encoders and players.

Figure 2:
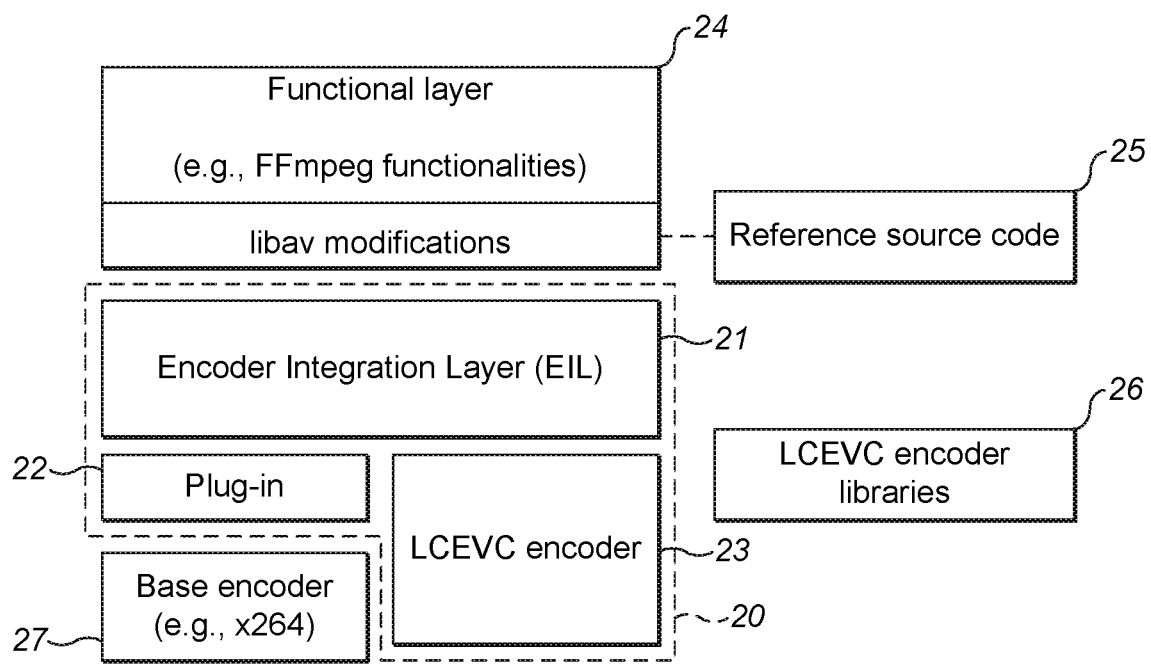
FIG. 2 shows a schematic of a software stack according to examples of the present disclosure.

FIG. 2 illustrates an example proposed software stack 20, conceptually. At the centre of the stack is an encoder integration layer 21 which controls operation of one or more encoder plug-ins 22 and the enhancement encoder 23 to generate an encoding of the input video signal using a base encoding layer and an enhancement encoding layer. The encoder integration layer 21 provides a control interface for the video encoder. That is, the encoder integration layer 21 provides an API through which calls can be made from an application layer, or functional layer 24, to instruct the encoding query properties or metadata of the encoding, and provide a configuration system. The encoder integration layer 21 combines the base encoder and the enhancement, orchestrating the combined behaviour. Moreover, the layer is architected to support any base codec implementation through a plug-in system that makes it generic and independent. In other words the encoder integration layer 21 integrates the user's intended functionality with the LCEVC and base encoding layers.

In preferred embodiments, the enhancement encoder 23 is an LCEVC encoder. The terms LCEVC encoder and enhancement encoder will be used throughout interchangeably. The LCEVC encoder 23 implements an enhancement encoding layer and receives a decoded video signal from one of the encoder plug-ins, the decoded video signal comprising a decoded version of an encoded video signal as controlled by said one of the one or more encoder plug-ins, and then generates an encoded enhancement signal for the encoded video signal. The encoded enhancement signal comprises one or more layers of residual data, the residual data being generated based on a comparison of data derived from the decoded video signal and data derived from an input video signal.

In the examples described herein, residuals may be considered to be errors or differences at a particular level of quality or resolution. Further details are provided, for example, in the descriptions of LCEVC referenced herein.

In addition to controlling the operation of the base encoding layer and the enhancement encoding layer, the encoder integration layer 21 provides a configuration system. Configuration properties may be set by the functional layer and are supported by a comprehensive built-in system of optimised parameter defaults. The encoder integration layer 21 employs ideal settings for both the LCEVC encoder 23 and base encoder 27, based upon key parameters passed to it by the application, e.g., resolution, bitrate, 'tune'. Tuning will be described in more detail below.

The one or more encoder plug-ins 22 provide a wrapper for one or more respective base codecs 27 to implement the base encoding layer. Each wrapper implements an interface for data exchange with a corresponding base codec 27, the base encoding layer being configured to encode and decode a video signal (i.e. by way of the base codecs 27).

The functional layer 24 may be implemented in reference source code 25 and the enhancement encoding software stack 20, comprising the plug-ins 22, the enhancement encoder 23 and the encoder integration layer 21, may be implemented as a set of encoder libraries 26.

Herein the functional layer 24 may be referred to interchangeably as the application layer or the user layer, as the functionality may be specifically coded by a user depending on the implementation required. The functional layer 24 comprises operations configured by the user to instruct the encoder integration layer 21, manage the functionality and provide calls to the API provided by the encoder integration layer 21, e.g. to query the properties or set the configurations of the enhancement coding.

As stated above, the functional layer 24 may be implemented at any level of a software stack. An example of an implementation of the functional layer may be the video coding tool FFmpeg. FFmpeg is a popular tool amongst video developers. In an example, the functional layer may be provided by FFmpeg functionalities and libav modifications. In certain cases, additional applications may be implemented above the functional layer 24, e.g. client applications may call upon video coding functions provided by FFmpeg, which in turn calls upon the control interface provided by the encoder integration layer 21 to provide the enhancement encoding.

Figure 3:
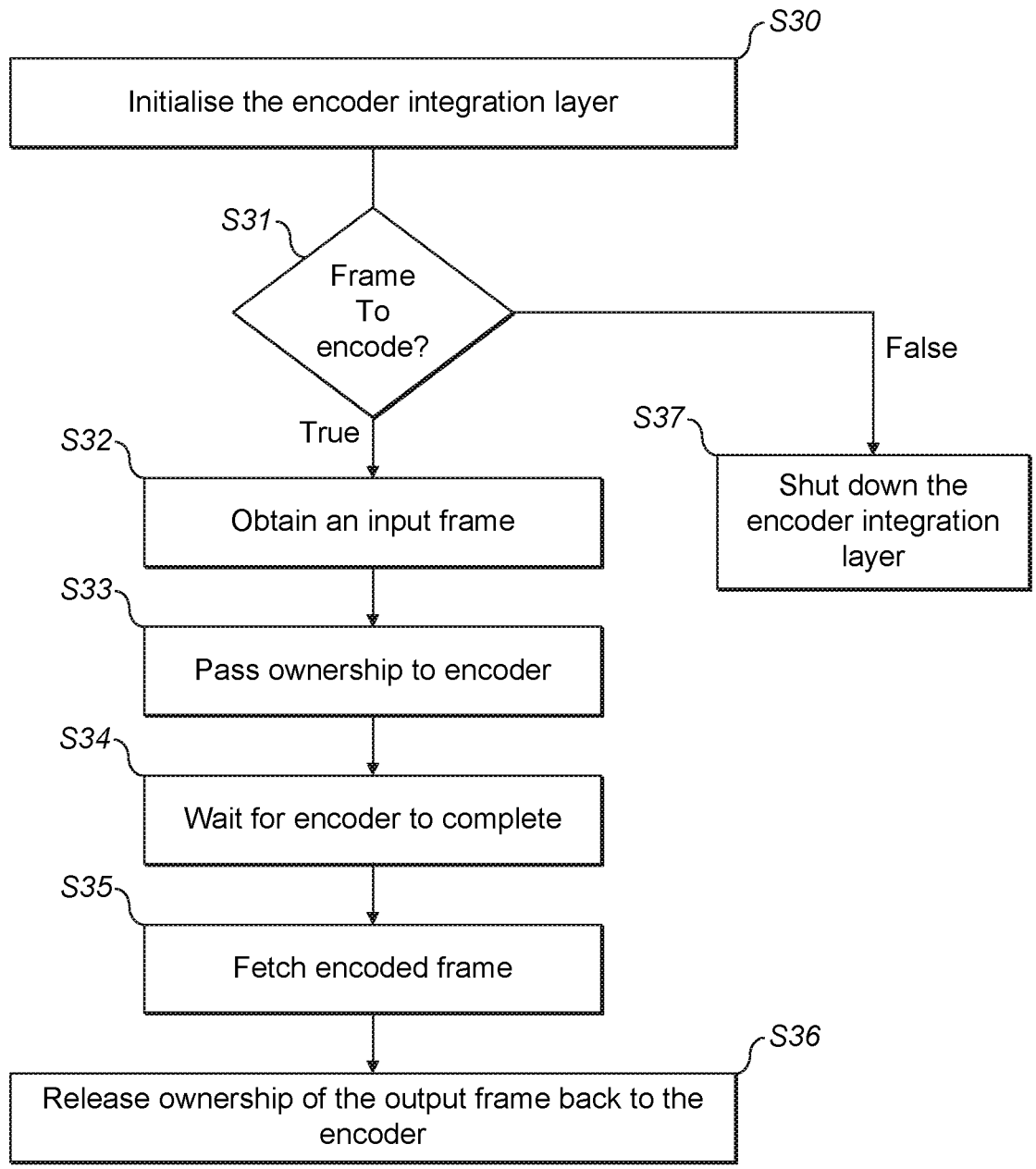
FIG. 3 shows a flow chart of functionality of the encoder integration layer; and, FIG. 4 shows a flow chart of use of the encoder integration layer.

FIG. 3 sets out an example flow diagram of steps for encoding streams using the encoder integration layer. Reference in this example to an "encoder" refers to an enhancement encoder as implemented by the software stack 20. In example implementations, the steps are performed by a functional layer or application layer. First, (step 30) the encoder integration layer that forms the control interface for the encoder is initialised. While there are frames to encode (step 31), the following steps are performed: obtain an input frame (step 32) and pass ownership of the input frame to the encoder, i.e. to the encoder integration layer (step 33); wait for the encoder to compete (step 34) and then fetch the encoded frame, e.g. in the form of an encoded bitstream (step 35); and, release ownership of the output frame back to the encoder (step 36), e.g. free up, at the encoder, the memory that was allotted to encode the input frame and generate the encoded frame. Once there are no frames to encoder, the encoder integration layer is shut down (step 37).

The input frame at step 32 may be obtained from an external source, e.g. it may be passed as data to the encoder integration layer, or it may be obtained from an internal source, e.g. it may be (directly) accessed from a referenced memory location. An input frame may be passed as a "picture" object as is described in more detail later below. In this case, passing ownership of the input frame may comprise passing ownership of the picture object to a process that is executed as part of the encoder integration layer. In general, "ownership" refers to control of memory locations where the frame data is stored (e.g. in Random Access Memory—RAM—or cache for a processing unit—whether central or graphical). In one case, ownership of the picture object may be first (temporarily) passed to an application in the functional or application layer to populate the data for the picture object before step 33 is performed, i.e. before the ownership is passed to the encoder integration layer for encoding. While the encoder has ownership of the picture object, it may not be possible for the application in the functional or application layer to manipulate the object. In the same manner, releasing ownership may mean that the encoder releases control of the picture object such that this may be manipulated again by the application, e.g. to load in data for a subsequent frame.

Figure 4:
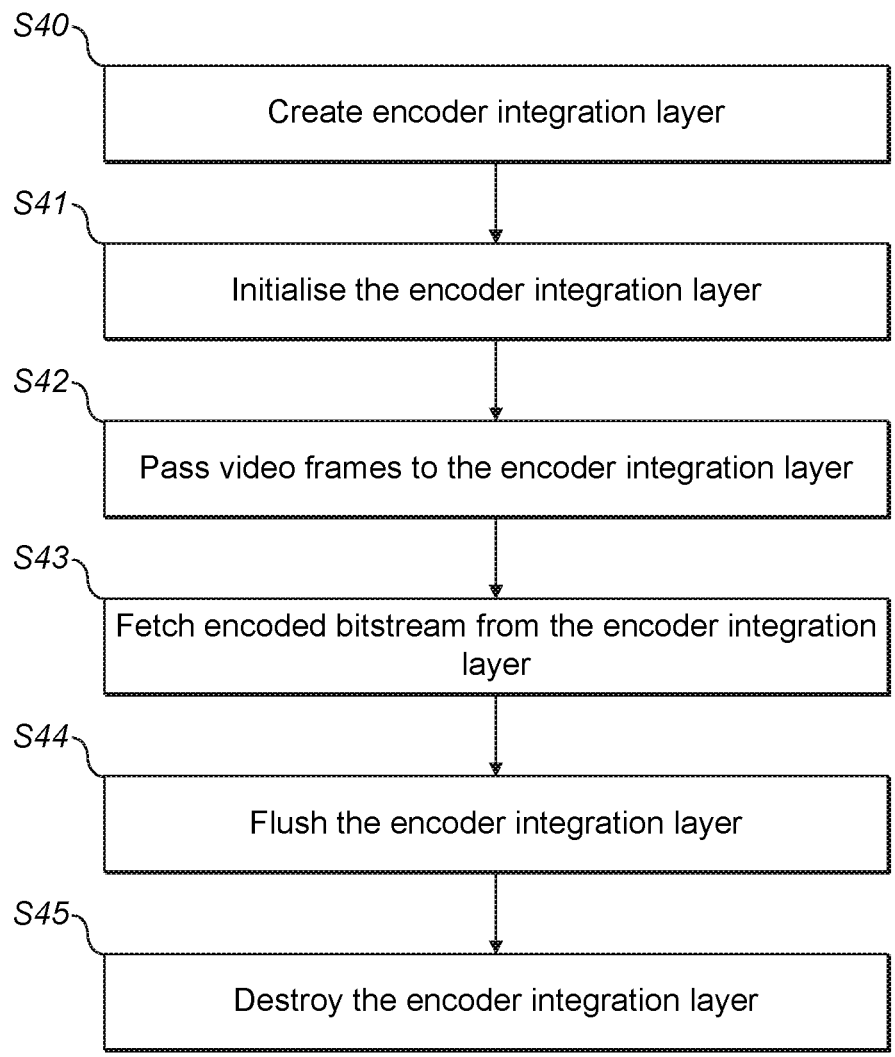

FIG. 4 sets out example steps of how the encoder integration layer may be integrated into a software stack. The steps of FIG. 4 may comprise a specific implementation of the more general method of FIG. 3.

At step 40, an instance of the encoder integration layer is first created. This may be created using a defined function call, e.g. an object instance creation (or "Open") method in a programming language such as C/C++. The instance of the encoder integration layer may provide a handle to the encoder integration layer that can be passed to other functions. Settings to open and initialise the encoder integration layer may be defined as a data structure such as a setting object. The settings may include, for example, the base encoder to be used, user data such as non-default parameters for the base encoder, and logging parameters such as a file path for a log file. The user data may include data to be passed through to the base encoder, via the plug-in(s). At creation of the instance, the settings object may be passed to the defined function call. In certain implementations, the settings object can be initialised to a default state.

In certain variations, the object instance creation function may be provided which has a version of the encoder integration layer (i.e. a version of the encoder API) appended at the end of the function name to ensure that a newer or older version of the encoder integration layer that contains breaking changes cannot be mistakenly used. If a requested base encoder cannot be found and instantiated or opened, an instance of the encoder integration layer may fail to be created (e.g. an object instance fails to "open"). The creation of the instance of the encoder integration layer may create a context (i.e. a set of data to allow processes to be run, including, for example, processor registers, reserved process memory and control registers to manage the task) that can be passed to other functions. In association with the object instance creation function, a corresponding object instance destruction function (e.g. a "Close" method) may also be defined. This may delete the instance and close or remove the context. The instance may be destroyed when the object instance destruction is called, as set out in step s45 below.

At step 41, the encoder integration layer (i.e. the instance of the encoder integration layer generated at step 40) is initialised. Again here, a settings object may be used to initialise different encoding parameters and properties. For example, a settings object may be used or created that specifies encoding properties, such as resolution, framerate, bitrate, transform type (e.g. a 2 by 2 or 4 by 4 Hadamard transform as defined within LCEVC), colour format (e.g. YUV) and Group of Pictures (GOP) length (in frames). Based on the settings object, the encoder integration layer may determine a GOP configuration, such as a configuration where only the first frame is an I-frame (Intra-frame) or a configuration where every frame is an I-frame. In certain embodiments, the encoding properties may be in the form of a JSON object string comprising the encoder options. The setting may also include a flag indicating if the picture is to be externally allocated, i.e. whether or not the input image's planes should be allocated by the integration or the encoder integration layer, as described elsewhere. If the colour format is not as expected, the encoder initialisation may convert the input into a suitable format, such as YUV in one example.

The encoding properties may be set as part of a powerful configuration system provided by the interface of the encoder integration layer. That is, configuration properties, except for the basic frame information which is set above in the opening or initialisation of the encoder integration layer, may set via a JSON configuration string in an initialisation settings data structure. It will of course be understood that JSON is of course only one example of a data structure that could be used to pass the configuration settings to the encoder integration layer using the control interface.

The configuration system may be supported by a comprehensive built-in system of optimised parameter defaults. The encoder integration layer employs preferred settings for both the LCEVC encoder and base encoder, based upon key parameters passed to it by the application, e.g., resolution, bitrate, tune. Tuning parameters will be discussed in more detail below.

Properties specified within the initialisation settings data structure, e.g. the JSON string, may override any setting provided by default or in a configuration database accessible by the encoder integration layer. Therefore, it is important that an application takes care to specify only properties within the JSON string that the user has explicitly set. For example, in a command-line program, only the options specified by the user in the command line may be included in the JSON string; or, from a Graphical User Interface (GUI), only the options that the user has manually specified a choice for may be included in the JSON string.

Upon successful initialisation, the user, or application layer, can proceed to encoding a picture input, such as a YUV input using the created and initialised instance of the encoder integration layer (for simplicity hereafter referred to as just "the encoder integration layer"). The encoder integration layer may thus be used as a control interface for the encoding. At step 42, if the previous steps were successful, the encoder integration layer is now ready to receive frames.

In the examples, it is proposed that there are two options for passing a video signal to the encoder integration layer: using an external input or data source (externally allocated) and using an internal input or data source (internally allocated). The option may be signalled to the encoder integration layer in the initialisation settings as set out above. An external input or data source may comprise a data object that is generated outside of the encoder integration layer and then passed to said layer. An internal input may comprise data that is fetched using internal methods of the encoder integration layer, e.g. from a defined portion of memory.

If the encoder integration layer is configured to not use an external input, i.e. to use an internal input or data source, then a pre-allocated frame can be fetched from the encoder integration layer, i.e. using internal methods. For example, a "GetPicture" method may be provided to obtain a picture object with pre-allocated planes. The planes can then be populated with frame data, e.g. from a defined internal data source such as a memory or file location. The encoder integration layer may additionally create a pool of pictures from which the method extracts data. The size of the pool depends on the base encoder's frame delay plus the encoder integration layer's frame delay, where frame delay is the number of frames that must be provided to the encoder before any output is produced.

Alternatively, the control interface of the encoder integration layer also provides support for the functional layer to externally allocate a picture for the encoding. For example, a picture object may be created using the encoder integration layer and supplied with data from the functional layer (e.g. the functional layer may call a picture object creation method and pass the external data for encoding that makes up the picture). The encoder integration layer may then set plane pointers to memory it has allocated and set a field to indicate the number of bytes per line. Hence, if the encoder integration layer is configured to accept an externally allocated input, the functional layer creates a suitable object and passes it to the encoder integration layer. In a further implementation example, the encoder integration layer may also be configured to accept Android hardware buffers, e.g. when the encoder integration layer is configured in a "GPU mode".

A picture object, e.g. as created by the functional layer in an external input mode or retrieved using an internal method, may contain all the information needed to encode a single frame of video, for example, the type of memory stored in the picture's planes (e.g. memory accessible from the CPU), pointers to the appropriate structures holding the plane data (these planes can be interleaved in the cases of the RGB formats; as such, the number of planes field may indicate the number of plane pointers rather than the number of channels—in the case of contiguous memory, each pointer may be set to the starting address of each plane, and the number of planes should be set as if the memory is not contiguous), the base type, the frame type and the presentation timestamp.

To instruct the encoder integration layer to control the encoding of frames, a picture object is obtained for the type of frame to be encoded. As described above, for an external input, the picture object may be created or retrieved by the functional layer which after creation or retrieval temporarily owns the picture object. Subsequently, component data (i.e. YUV) may be loaded into the pre-allocated memory of the plane member of the picture object. Finally, the encoding may be instructed by calling an encoding method (e.g. Encode(PicObject)) provided by the encoder integration layer and passing or referencing the picture object to begin encoding the picture. The encoding method may take both a picture object and an encoding context as input, or the encoding context may be provided by the encoder integration layer. Following this instruction to begin encoding, the encoder retakes ownership of the picture object and it is no longer valid for the functional layer to manipulate it. This may be a blocking call for the duration of encoding of a single frame.

At step 43, following encoding, the encoded bitstream is fetched from the encoder integration layer. The encoder integration layer may output encoded data after receiving one or more frames of input data. The encoded data may be fetched using an output function (e.g. GetOutput( . . . )). If there is output data available, then a success indication may be returned. If there is no data available and no errors occurred during encoding then a finished notification may be returned. The output function of the encoder integration layer may provide a pointer to the encoded bitstream and provide ownership of the output data object to the caller (e.g. the functional layer). The encoder integration layer may generate more than one output per single input, for example, when generating an interlaced encoding. The functional layer may then utilise the output data, e.g. by writing it directly out to file or copying it if it must be buffered for output in a multiplexing system. Following further processing of the encoded data, the functional layer may release the output data object back to the ownership of the encoder such that it is no longer valid for the functional layer to read from the object (e.g. during the encoding of a subsequent picture).

The output data may be provided as a data structure containing information for an encoded frame of data. In example implementations these may not be created manually, and may be treated as read-only data structures. In addition to a pointer to the location of the data, the data structure may comprise or indicate myriad properties of the encoded data, such as: frame type and/or field type (e.g. whether the frame that produced this output is progressive, interlaced or a field); base type and/or keyframe (e.g. the type of frame that the base encoder produced, and whether or not it is flagged as a keyframe); quantisation parameters (e.g. the Quantisation Parameter—QP—of the frame, as reported by the base encoder); presentation timestamp (e.g. the presentation timestamp of the encoded frame, i.e. of the input frame or produced by the base encoder); decode timestamp (e.g. the decode timestamp of the encoded frame, as produced by the base encoder); a configuration flag (e.g. indicating whether the data in this output is the encoders configuration or the base encoders configuration—for example, if the base encoder is an H.264 encoder and config is 1, then the output contains only the SPS and PPS NAL units and the configuration output is presented before any frame data) data length; and, user data (e.g. the user data that was set on the picture that produced this frame).

Returning to FIG. 4, when an input data source such as file stream has been exhausted, this may be signalled to the encoder integration layer to indicate that no more input data is available. For example, this may be performed by passing a null value to the encode function discussed above. On receipt of a signal indicating that there is no further input, the encoder integration layer then finishes processing any queued video frames and completes any actions to be performed at the end of the stream. At step 44 of Figure, to complete encoding, the encode function is called using a null pointer for the picture object argument, and this is used as indication by the encoder integration layer to flush the entire pipeline. This is a blocking call whilst the remaining pictures are encoded; subsequent calls may have no effect. Once encoding has finished, then the encoding integration layer (i.e. the particular instance) can be destroyed at step 45. A close function may be provided in the control interface of the encoder integration layer to safely shut down and release the encoding context.

In the methods above, various functions associated with the encoder integration layer are described. These include an instance creation function (e.g. Open( . . . )), an initialise function (e.g. Init( . . . )), a picture data retrieval function (e.g. GetPicture( . . . ) for internal data sources), an encoding function (e.g. Encode( . . . )), an output retrieval function (e.g. GetOutput( . . . )), a release output function (e.g. ReleaseOutput), and a close function (e.g. Close( . . . )). Functions such as these (which as considered non-limiting and non-exhaustive) may be considered to be a control interface provided by the encoder integration layer. It should be noted that in the present description, the terms "control interface", callable "functions", and API are considered as synonyms for mechanism that allows control of the encoder integration layer from the functional layer. In certain examples, the control interface provided by the encoder integration layer may also provide a mechanism for the functional layer to indicate a dynamic reconfiguration during encoding of a video signal. If the base encoder also supports dynamic reconfiguration, then the encoder integration layer may instruct dynamic reconfiguration of the base encoder using the plug-ins. This may be performed by passing settings to a reconfigure function provided by the control interface of the encoder integration layer. The encoder integration layer and the plug-ins then have internal methods to control the dynamic reconfiguration, e.g. parameters may be passed to different interfaces of different base encoder using a single common plug-in interface that is available to the encoder integration layer. The settings may be provided in a suitable data structure.

As described above in the context of FIG. 2, the software stack 20 provides one or base encoder plug-ins 22. Base encoder plugins, implementing their corresponding wrappers, may be dynamically loaded at runtime, based upon the name of the base encoder specified in the data structure comprising the settings used to open the encoder integration layer, as described above.

As described above, in certain implementations, an interface may be provided for the encoder integration layer to interact with the plug-ins. This allows a user to optionally implement their own base encoder through the plugin system without the need to be embedded within the encoder integration layer, and provides the benefits of modularity. Examples of an interface being provided between two encoders are provided in WO 2017/089839, which is incorporated herein by reference.

As noted above, the encoder integration layer may provide a powerful configuration system as part of the control interface. For example, one or more API commands may be provided by the encoder integration layer to allow the functional layer to query certain properties. The configuration system may use a combination of read-only and writable properties accessible to the functional layer. In an implementation, all publicly available encoding configuration properties for the base encoder and LCEVC enhancement can be queried through the API.

In one example, properties can be anonymously queried by a call to a properties group. This will return an array of all property groups which each contain an array of all properties in that group. If the user knows the name of properties, the property can be directly queried by a specific call to the interface. Each property typically contains a name, description and the expected type of that property and its current value.

The interface also provides a mechanism for the functional layer, i.e. the user, to query metadata of the encoders. Metadata works much in the same way as properties, except that they are queried only from the system, and they cannot be set externally. They can be treated as read-only properties.

In one specific implementation, metadata can only be queried by name.

Example metadata that can be queried include: the underlying technology of the base encoder plugin utilised (for example, the libx264 plugin will output "H264" in this metadata); the width of the base encoded video; and, the height of the base encoded video.

Advantageously, the interface also implements an extension to properties allowing access to a contiguous block of memory (e.g. a so-called "blob"), into which the encoder integration layer may place metadata. This system is incorporated with the base encoder plug-in, or worked together with the plug-in, such that a base encoder can output some data (e.g. configuration information) to one or more blocks of memory, with the encoder integration layer being ignorant to its usage. This system is used to allow the encoder integration layer to report to the user some internal values, or data that are either not interpreted as properties, or that cannot be expressed as properties. For example, an FFmpeg sample integration may utilise this feature to obtain the H.264 global headers from the libx264 Base encoder plugin to be used for HTTP Live Streaming (HLS).

In one implementation example, this extension may be available when the 'global-header' x264 property is set to 1 and may allow access, via the encoder integration layer, to a contiguous block of memory containing the H.264 headers (PPS, SPS, etc.) from an underlying H.264 base codec. The extension can be used when the output data structure is segmented, so that the headers can be injected at the start of each segment.

The configuration system also provides for a mechanism to select a predetermined set of parameters to provide for predefined optimisations. These were mentioned above as "tuning" parameters and may be instructed to the encoder integration layer as part of the initialisation settings. In one case, each "tuning", i.e. set of parameters, may represent a different encoding aim or goal.

Depending on the chosen tuning, the encoder is then able to implement the defined settings and parameters that are deemed (e.g. via testing or experimentation) optimal for that goal. In a rudimentary example, the settings may choose 'tuning' #1 and the encoder integration layer may choose a plurality of parameters according to that optimisation. When using an AVC base encoder there may be with a set of x264 'tunes', e.g. indicating different variants of LCEVC tuning, according to the aim of the encoding. Examples include optimising for visual quality, for the Video Multimethod Assessment Fusion (VMAF) metric, for VMAF NEG (No Enhancement Gain) metric, for PSNR, for structural similarity (e.g. according to a structural similarity index measure—SSIM or a multi-scale structural similarity index measure—MS-SSIM) or for visual quality of animation.

In certain examples, an encoder as described herein may encode enhanced streams in Constant Bitrate mode (CBR) or (either uncapped or capped) Constant Rate Factor (pCRF) mode. For example, these may be set as part of the settings that are used to instantiate and/or initialise the encoder integration layer. Rate control may be applied according to different modes: e.g. "chunk" (default) or "rolling window". When in streaming "chunk" mode, a rate controller implemented by the encoder integration layer resets the leaky bucket fill up level at the beginning of each streaming chunk, to avoid unnecessary influence from one chunk to the next (e.g. making a chunk slightly smaller than the target bitrate just because the previous one was slightly bigger, or vice versa). When in "rolling window" mode, instead, the leaky bucket fill up level is never reset. "Chunk" mode is recommended for average bitrate (ABR) chunk-based streaming, while "rolling window" mode is recommended for low-latency video as well as for tests involving short self-similar sequences. "Chunk" mode may be active by default, so there may be no need to explicitly specify the corresponding setting. To activate the "rolling window" mode, a command or data item may be set within the settings properties. Similarly, the rate control window length may be varied. A pCRF mode may be applied in a manner similar to comparative CRF modes in other codecs. It may apply custom processing within the encoder integration layer. Further details may be found in WO 2020/188230, which is incorporated by reference herein. The pCRF mode may ensure that a certain quality factor is maintained throughout the encoded video, with uncapped bitrates. In a similar manner to comparative use in AVC, lower pCRF values mean less compression and higher quality, at the expense of larger file sizes. The pCRF value may be defined as a floating-point fractional number with a meaning similar to AVC's CRF (e.g. typical value range 20-36), controlling the overall quality of base and enhancement encoding as controlled by the encoder integration layer. To activate pCRF, a setting may be provided to the encoder integration layer, and the encoder integration layer may in turn control the plug-ins and the LCEVC encoder.

Examples presented herein provide an encoder integration layer that allows the behaviour of a base encoder and an LCEVC encoder to be coordinated or orchestrated to encode a base stream and an LCEVC enhancement stream. A set of plug-ins may present a common (i.e. single specification) interface to the encoder integration layer, to allow the encoder integration layer to control different underlying base codecs. Each underlying base codec may have a different plug-in, where the plug-in provides an interface specific to the base codec for control of the base encoder and the common interface to the encoder integration layer, i.e. effectively "wrapping" the functionality of the base codec. This then allows different base codecs to be supported using different plug-ins, where the plug-in may be easily implemented as a command mapping and the more complex control is performed by the encoder integration layer. Similarly, the LCEVC encoder may comprise an encoder configured to output an LCEVC enhancement stream that is decodable by a standard-defined decoder. The encoder integration layer controls the operation of the base encoder via the plug-in and the LCEVC encoder. The encoder integration layer may coordinate the exchange of picture data between the base and LCEVC encoders and control the output of a single multiplexed stream for transmission or storage. The encoder integration layer provides an easy to use interface for both base and LCEVC encoding that may be used by a client application within the functional layer, such that the client application may create an LCEVC encodings as easily as a comparative base encoding, the encoder integration layer appears to the client application as just "another encoder" and the multi-layer processing is hidden from the client application.

At the encoder, for example implemented in a streaming server or client device or device encoding from a data store, methods and processes described herein can be embodied as code (e.g., software code) and/or data. The encoder may be implemented in hardware and/or software as is well-known in the art of data compression. For example, hardware acceleration using a specifically programmed Graphical Processing Unit (GPU) or a specifically designed Field Programmable Gate Array (FPGA) may provide certain efficiencies. This may be the case for implementation of a set of base codecs and/or the LCEVC encoder. For completeness, code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A video encoder comprising:
one or more encoder plug-ins that provide a wrapper for one or more respective base codecs to implement a base encoding layer, each wrapper implementing an interface for data exchange with a corresponding base codec, the base encoding layer being configured to encode and decode a video signal;
an enhancement encoder to implement an enhancement encoding layer, the enhancement encoder being configured to:
receive a decoded video signal from one of the one or more encoder plug-ins, the decoded video signal comprising a decoded version of an encoded video signal generated by said one of the one or more encoder plug-ins, and
generate an encoded enhancement signal for the encoded video signal, the encoded enhancement signal comprising one or more layers of residual data, the residual data being generated based on a comparison of data derived from the decoded video signal and data derived from an input video signal, and,
an encoder integration layer to control operation of the one or more encoder plug-ins and the enhancement encoder to generate an encoding of the input video signal using the base encoding layer and the enhancement encoding layer,
wherein the encoder integration layer provides a control interface for the video encoder.

2. The video encoder according to claim 1, wherein the encoder integration layer is configured to: receive ownership of a frame of the input video signal; instruct encoding of the frame by the one or more encoding plug-ins and the enhancement encoder; and, provide a pointer to a location of output data upon request via the control interface.

3. The video encoder according to claim 2, wherein the pointer is provided within a data structure further comprising ancillary information associated with the encoding of the input video signal.

4. The video encoder according to claim 1, wherein the encoder integration layer is further configured to create a data structure for a type of frame to be encoded from the frame of the input video signal, the data structure comprising a set of planes which collectively make up the frame, and to populate the planes with frame data from the frame of the input video signal.

5. The video encoder according to claim 1, wherein the encoder integration layer is further configured to identify that a frame is externally allocated and retrieve a data structure comprising a set of planes which collectively make up a frame of the input video signal and a set of parameters necessary to encode the frame.

6. The video encoder according to claim 1, wherein the encoder integration layer is configured to obtain a set of encoding properties and, upon initialisation of the encoder integration layer, via the control interface, confirm successful initialisation according to the encoding properties.

7. The video encoder according to claim 6, wherein the encoder integration layer is configured to receive a further set of encoding properties and instruct a reconfiguration of the base encoder layer using the one or more encoder plug-ins.

8. The video encoder according to claim 1, wherein the encoder integration layer is configured to: obtain a set of configuration defaults; retrieve a configuration data structure comprising one or more configuration properties; and override a configuration default of the set of configuration defaults corresponding to the one or configuration properties.

9. The video encoder according to claim 1, wherein the control interface comprises a set of predefined queries, wherein the encoder integration layer is configured to receive a query from the set of predefined queries and return a corresponding encoding or configuration property of the encoder integration layer.

10. The video encoder according to claim 1, wherein the control interface comprises a set of predefined metadata queries, the encoder integration layer is configured to receive a query for one or more metadata properties, wherein the encoder integration layer is configured to retrieve metadata from the one or more encoder plug-ins and return a read-only metadata property corresponding to the one or more metadata properties.

11. The video encoder according to claim 1, wherein the control interface comprises a set of predefined metadata queries, and wherein the encoder integration layer is configured to receive a query for one or more metadata properties, and the encoder integration layer is configured to retrieve metadata from the one or more encoder plug-ins and return a location of a block of memory storing the metadata in response to the query.

12. The video encoder according to any-preceding claim 1, wherein the control interface provides a set of predetermined optimisation instructions and wherein the encoder integration layer is configured to receive one or more of the predetermined instructions and optimise the operation of the one or more encoder plug-ins and the enhancement encoder in accordance with a predefined variant corresponding to the received instructions.

13. A method of encoding a video signal using a video encoder, the method comprising:
    initialising an encoder integration layer;
    while there are frames to encode of an input video signal:
        retrieving an input frame of the input video signal and passing ownership of the frame to the video encoder via a control interface;
        waiting for the video encoder to encode the input frame and subsequently fetching output data; and
        releasing ownership of the output data back to the encoder integration layer, and shutting down the encoder integration layer.

14. A non-transitory computer readable medium comprising instructions which, when executed by a processor, cause the processor to carry out the method of claim 13.

15. A video encoding system, comprising:
    a video encoder according to claim 1;
    one or more base codecs; and,
    an application layer which provides one or more calls to the video encoder via the control interface to instruct video encoding.

16. The video encoding system according to claim 15, wherein the application layer is configured to, via the control interface:
    initialise the encoder integration layer;
    while there are frames to encode of an input video signal:
    retrieve an input frame of the input video signal and pass ownership of the frame to the video encoder via the control interface;
        wait for the video encoder to encode the input frame and subsequently fetch output data; and,
        release ownership of the output data back to the encoder integration layer, and shut down the encoder integration layer.

17. An encoder integration layer to control operation of one or more encoder plug-ins and an enhancement encoder to generate an encoding of an input video signal using a base encoding layer and an enhancement encoding layer, wherein the encoder integration layer provides a control interface for a video encoder,
    wherein the one or more encoder plug-ins provide a wrapper for one or more respective base codecs to implement the base encoding layer, each wrapper implementing an interface for data exchange with a corresponding base codec, the base encoding layer being configured to encode and decode a video signal; and,
    the enhancement encoder implements an enhancement encoding layer, the enhancement encoder being configured to:
    receive a decoded video signal from one of the one or more encoder plug-ins, the decoded video signal comprising a decoded version of an encoded video signal generated by said one of the one or more encoder plug-ins, and
    generate an encoded enhancement signal for the encoded video signal, the encoded enhancement signal comprising one or more layers of residual data, the residual data being generated based on a comparison of data derived from the decoded video signal and data derived from the input video signal.

* * * * *